US 6,623,031 B2

(12) United States Patent
Haland et al.

(10) Patent No.: US 6,623,031 B2
(45) Date of Patent: *Sep. 23, 2003

(54) SIDE IMPACT AND ROLL OVER INFLATABLE HEAD PROTECTOR

(75) Inventors: Yngve Haland, Falsterbo (SE); Lars-Erik Florberger, Lidköping (SE); Sture Andersson, Nacka (SE); Simomn Valkenburg, Macclesfield (GB); I. Jörgen Svensson, Saltsjö-Boo (SE)

(73) Assignee: Autoliv Development AB, Vargarda (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/284,155

(22) Filed: Oct. 31, 2002

(65) Prior Publication Data

US 2003/0047921 A1 Mar. 13, 2003

Related U.S. Application Data

(63) Continuation of application No. 09/964,573, filed on Sep. 28, 2001, now Pat. No. 6,494,480, which is a continuation of application No. 09/589,402, filed on Jun. 8, 2000, now Pat. No. 6,312,009, which is a continuation of application No. 09/127,918, filed on Aug. 3, 1998, now Pat. No. 6,099,029, which is a continuation of application No. 08/604,052, filed on Feb. 20, 1996, now Pat. No. 5,788,270.

(30) Foreign Application Priority Data

Feb. 20, 1995 (GB) ............................................. 9503267

(51) Int. Cl.$^7$ ........................... B60R 21/22; B60R 21/24

(52) U.S. Cl. ..................................... 280/729; 280/730.2

(58) Field of Search ........................... 280/730.2, 730.1, 280/729, 743.1, 743.2, 728.1, 753, 749

(56) References Cited

U.S. PATENT DOCUMENTS

| | | | |
|---|---|---|---|
| 3,731,949 A | 5/1973 | Radke | |
| 3,792,873 A | 2/1974 | Buchner et al. | |
| 3,897,961 A | 8/1975 | Leising et al. | |

(List continued on next page.)

FOREIGN PATENT DOCUMENTS

| | | |
|---|---|---|
| DE | 2222621 | 11/1972 |
| DE | 4134995 | 3/1993 |
| DE | 4307175 | 9/1993 |

(List continued on next page.)

*Primary Examiner*—Peter C. English
(74) *Attorney, Agent, or Firm*—Venable LLP; Robert Kinberg; Catherine M. Voorhees

(57) ABSTRACT

A safety device for a motor vehicle which has a door frame and a door contained within the door frame. The safety device includes: a gas generator; a sensor for sensing at least one of a side impact and a roll-over for activating the gas generator; and an inflatable element connected to the gas generator for being inflated with gas from the gas generator upon activation of the gas generator. The inflatable element can thus assume a non-inflated mode and an inflated mode and can further be positioned adjacent the door in an inflated-mode thereof. The inflatable element is further made of fabric and includes: a first fabric layer defining a front part thereof; a second fabric layer defining a back part thereof, selected parts of the first fabric layer and second fabric layer being interconnected for defining one of linear and point shaped links where the first fabric layer and the second fabric layer are directly secured together. The inflatable element thus incorporates a plurality of substantially parallel elongated cells defined between the links, the cells being configured such that, upon inflation of the inflatable element with the gas from the gas generator, a lower edge portion of the inflatable element is tensioned. The inflatable element further includes an upper edge portion which is configured to be secured to the door frame all along a non-linear part of the door frame.

6 Claims, 5 Drawing Sheets

U.S. PATENT DOCUMENTS

| | | |
|---|---|---|
| 4,227,717 A | 10/1980 | Bouvier |
| 5,322,322 A | 6/1994 | Bark et al. |
| 5,333,899 A | 8/1994 | Witte |
| 5,588,672 A | 12/1996 | Karlow et al. |

FOREIGN PATENT DOCUMENTS

| | | |
|---|---|---|
| DE | 4231522 | 3/1994 |
| EP | 0584781 | 3/1994 |
| EP | 0590518 | 4/1994 |
| GB | 962946 | 7/1964 |
| GB | 2191450 | 12/1987 |
| GB | 2261636 | 5/1993 |
| GB | 2278812 | 12/1994 |
| JP | 5-131889 | 5/1993 |
| WO | 90/09295 | 8/1990 |
| WO | 94/19215 | 9/1994 |

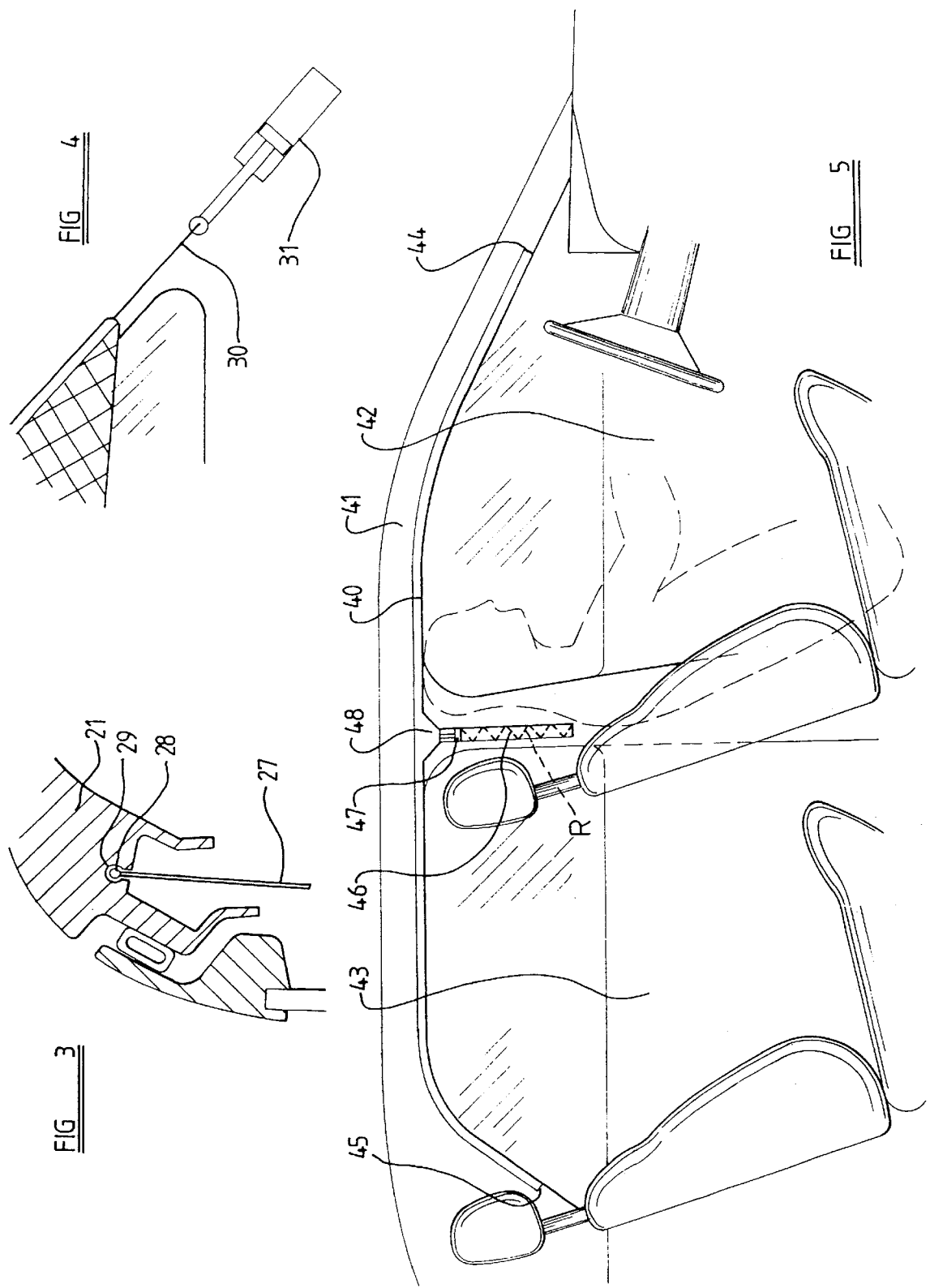

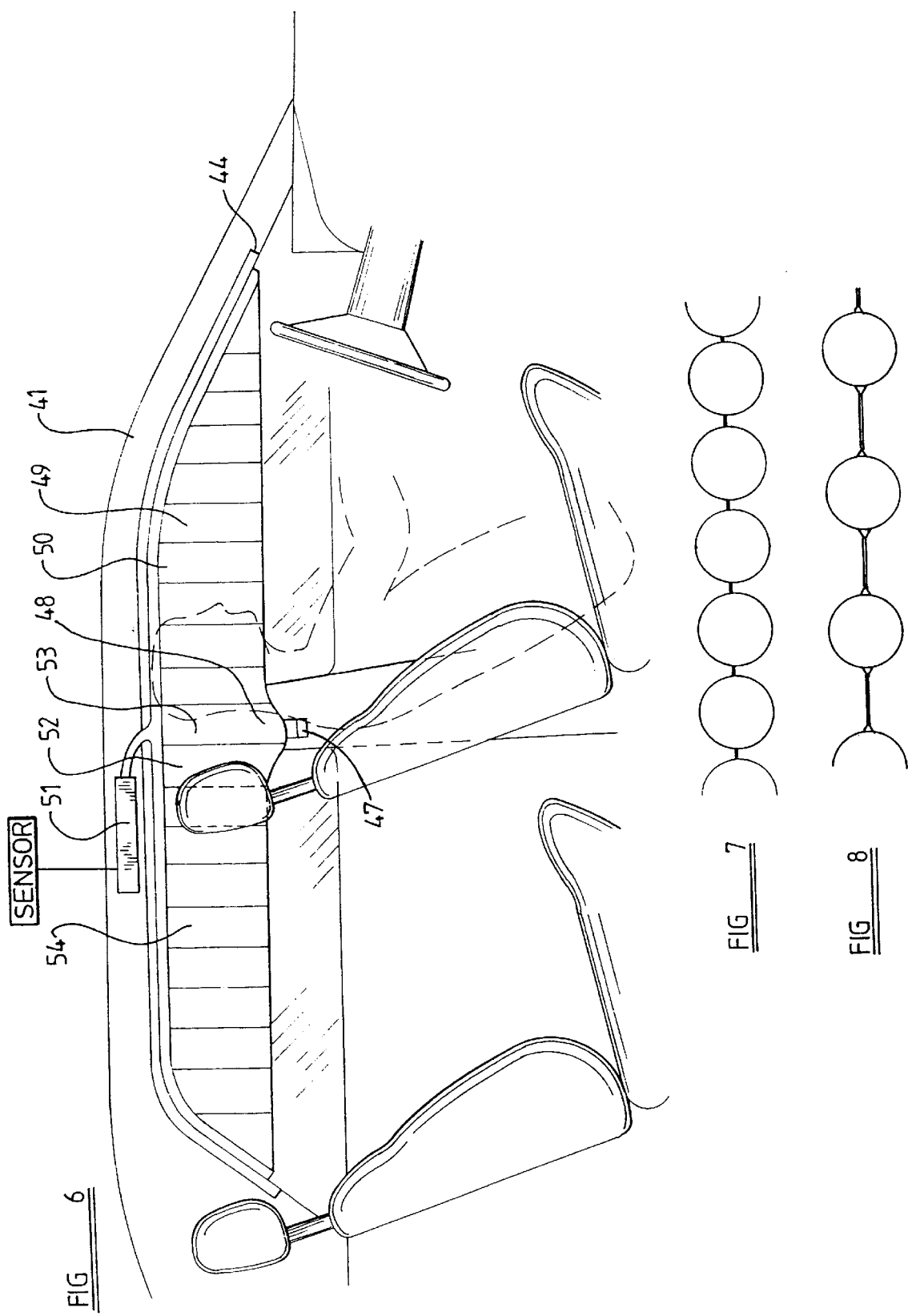

SIDE IMPACT AND ROLL OVER INFLATABLE HEAD PROTECTOR

CROSS REFERENCE TO RELATED APPLICATION

This application is a continuation of U.S. application Ser. No. 09/964,573 filed Sep. 28, 2001, now U.S. Pat. No. 6,494,480, which is a continuation of U.S. application Ser. No. 09/589,402 filed Jun. 8, 2000, now U.S. Pat. No. 6,312,009, which is a continuation of U.S. application Ser. No. 09/127,918, filed Aug. 3, 1998, now U.S. Pat. No. 6,099,029, which is a continuation of U.S. application Ser. No. 08/604,052, filed Feb. 20, 1996, now U.S. Pat. No. 5,788,274.

FIELD OF THE INVENTION.

THIS INVENTION relates to a safety device, and more particulary relates to a safety device in a motor vehicle such as a motor car.

BACKGROUND OF THE INVENTION

When a motor vehicle is involved in an accident there is a risk that the driver and passengers within the vehicle will be injured. It has been proposed to provide vehicles with safety devices to reduce the risk of such injury.

Certain safety devices are intended to provide protection in the case of a side impact. U.S. Pat. No. 5,322,322 discloses such a device. An inflatable tube is initially stored in a recess in the door frame above the door of the vehicle, and the ends of the tube are pivotally anchored to fixed points on the door frame. A sensor is provided to sense when an accident occurs, and to initiate inflation of the tube. As the tube inflates its length decreases, and it then extends linearly between the two fixed points on the door frame. The inflated tube provides some protection for the head of a person sitting in the vehicle. However, the tube is inflated to a substantial pressure, and thus the head of a person in the vehicle may tend to bounce off the tube. The tube may not cover the whole of the area of the window, and may not even cover the whole of the upper part of the window. There is thus a risk that the head of the person in the vehicle may move past the tube and pass through the window opening. If a car is rolling over this is very undesirable.

SUMMARY OF THE INVENTION

This invention seeks to provide an improved safety device.

According to this invention there is provided a safety device in a motor vehicle, the device comprising a gas generator, incorporating or associated with a sensor adapted to sense a side impact or a roll-over and to activate the gas generator, and an inflatable element connected to the gas generator to be inflated by gas from the gas generator, the inflatable element being made of fabric comprising a first layer to define the front part of the inflatable element, and a second layer to define the back part of the inflatable element, selected parts of the first layer and the second layer being interconnected to define points or lines where the front part and back part of the inflatable element are secured together, the inflatable element incorporating a plurality of substantially parallel elongate cells, the inflatable element having an edge portion secured to part of the door frame of the vehicle, which is non-linear, the inflatable element, when inflated, being positioned adjacent the door contained within the door frame.

The inflatable element, when inflated, is thus located between the head of a person sitting in the vehicle and an adjacent door. Usually such a door is provided with a window and so the inflated element provides protection from breaking glass from the window, and also prevents the head of the person in the vehicle from striking the window, or from being thrown out through the window, as can happen, particularly with roll-over accidents.

Preferably the safety device is usually initially stored in a recess provided in the doorframe.

Preferably the inflatable element is made of interwoven fabric layers, the selected parts of the first layer and the second layer being interwoven. Preferably there is internal venting between the cells as this may reduce undesirable bounce that might occur if the cells were discrete and not vented to each other.

The cells may be immediately adjacent each other or may be spaced apart. At least some of the cells may be of conical form when inflated.

The inflatable element may be formed of a fabric with parts of the fabric being interwoven to form the cell or cells. The fabric may have a single layer weight of less than 300 g/sq m, such as a weight of 175 g/sq m.

Preferably when the inflatable element is inflated the pressure of gas is approximately 3 bar. Preferably the inflatable element, when inflated, extends past the B-post of the vehicle, to provide protection for the head of the driver. If the head of the driver should impact with the B-post in an accident the consequences could be fatal.

In one embodiment the inflatable element incorporates a strap to connect part of the inflatable element to the door frame. The strap is tight, that is, tensioned to a significant extent, when the inflatable element is inflated.

Separate means may be provided to apply tension to part of the inflatable element when it is inflated, such as a piston and cylinder, adapted to be moved by gas from a gas generator when the inflatable element is inflated, to apply tension to one edge of the inflatable element, to hold the inflated element in a desired position.

In one embodiment the inflatable element is provided with means adapted to move from an initial position to a further position on inflation of the inflatable element, an arrangement being provided to retain the means in the further position. Thus, a slider may be provided adapted to slide along a ratchet, and to be retained by the ratchet when it has moved to a further position.

BRIEF DESCRIPTION OF THE DRAWINGS

In order that the invention may be more readily understood and so that further features thereof may be appreciated the invention will now be described by way of example with reference to the accompanying drawings in which FIG. 3 is a sectional view of part of the embodiment of FIG. 2, in a plane perpendicular to a longitudinal axis of the vehicle.

FIG. 4 is a view of part of FIG. 2 showing an additional component of the safety device, FIG. 5 is a side view of the interior of a motor vehicle provided with another form of safety device in accordance with the invention, before the safety device moves to the operative state, FIG. 6 illustrates the vehicle of FIG. 5 when the safety device is in the operative state, FIG. 7 is a sectional view of one form of safety device as shown in FIG. 1 or in FIGS. 5 and 6, in a plane perpendicular to the vertical direction.

FIG. 8 is a sectional view of another form of safety device as shown in FIG. 1 or in FIGS. 5 and 6.

DETAILED DESCRIPTION OF THE INVENTION

Figure 1:
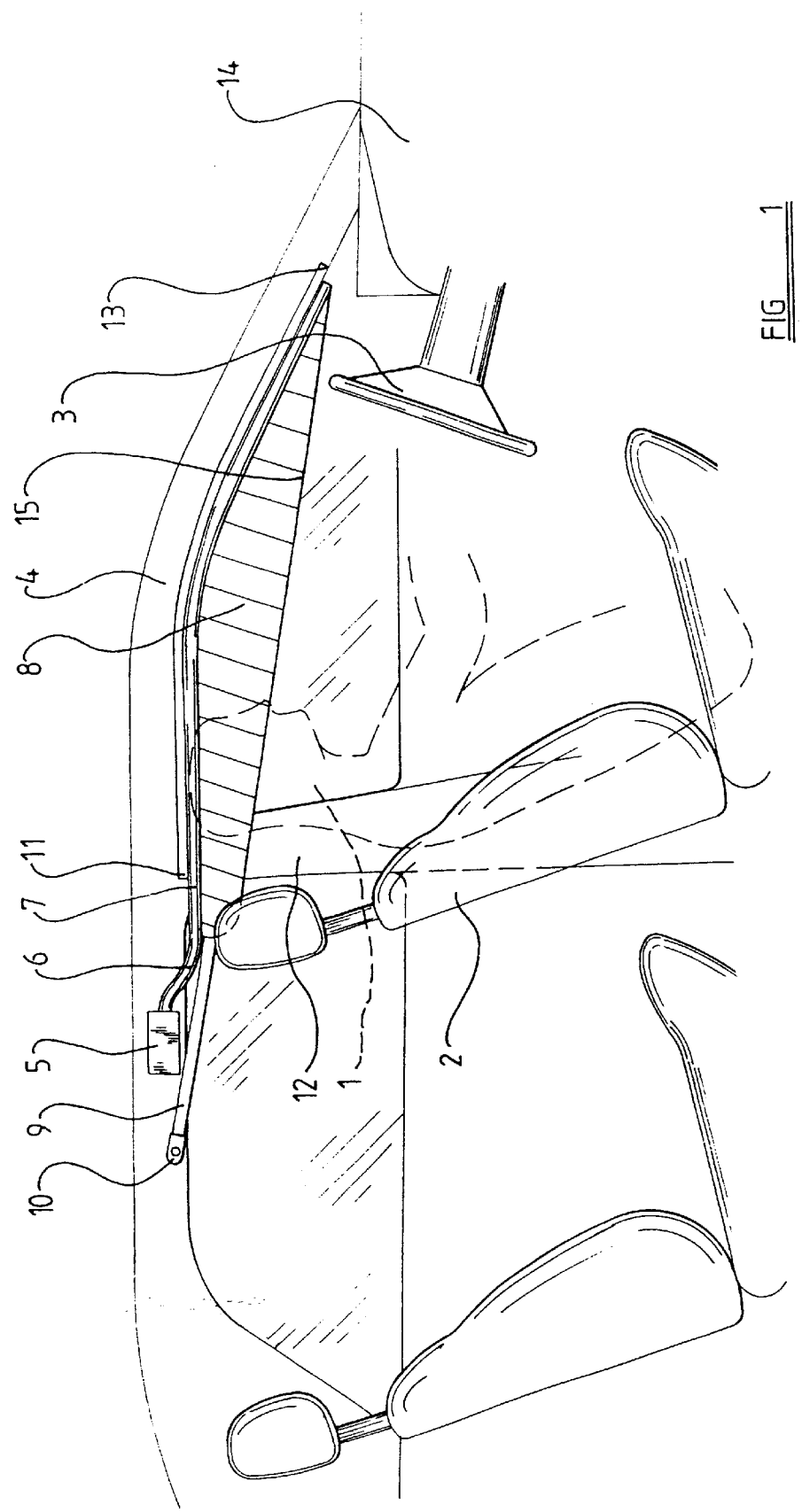
FIG. 1 is a side view of the interior of a motor vehicle illustrating a safety device in accordance with the invention in an operative state.

Referring initially to FIG. 1 a safety device is illustrated which is intended to provide protection for a person 1 sitting in a seat 2 in the vehicle. In any accident in which the vehicle is decelerated the person will tend to move forwardly towards the steering wheel 3, but will be restrained by a conventional seat belt or airbag. In the case of a side impact or roll-over, there is a risk that the head of the person 1 will strike the window in the door beside the person, or strike the B-post. There is also a risk that if, as most commonly happens, the glass in the window should break, the head of the person 1 may be thrown out of the window, especially in the case of roll-over.

The safety device shown in the operative state in FIG. 1 is initially retained in a recess provided in the door frame 4 located above the door of the vehicle. The recess extends over more than simply a linear portion of the door frame so that the two ends of the recess are not in alignment with the main part of the recess.

The safety device comprises a gas generator 5, which is adapted to generate gas, such as cold gas. The gas generator incorporates, or is associated with, a sensor which senses a side impart and/or a roll-over situation to activate the gas generator at an appropriate instant. The gas generator is connected by a hose 6 to a duct 7. The duct 7 forms part of an inflatable element. The inflatable element incorporates a plurality of parallel substantially vertical, substantially cylindrical cells 8. The inflatable element may be made of interwoven fabric. Such a fabric comprises a first layer that defines the front of the inflatable element—that is to say the part that is visible in FIG. 1—and a second layer that defines the back part-that is to say the part that is adjacent the window in FIG. 1—selected parts of the first region and the second region being interwoven to define links in the form of points or lines where the front part and the back part of the inflatable element are secured together. A technique for making an inflatable element of interwoven fabric is described in more detail in International Patent Publication WO 90/09295.

A webbing strap 9 that forms part of the inflatable element extends from the end of the inflatable element near the duct 7 which is connected to the hose 6 to an anchoring point 10 on the door frame 4. The edge of the duct 7 between the points 11, adjacent the top of the B-post 12, and 13, at the lower part of the A-post, in the region of the dashboard 14, is fixed securely to the door frame 4. Consequently, it is to be understood that the upper edge of the inflatable element has a non-linear configuration which conforms with the non-linear configuration of the upper part of the door frame 4 by virtue of the inflatable element being secured, at an upper edge portion thereof, to the door frame all along a non-linear part of the door frame as shown in the figures. A substantial part, in fact virtually all, of the upper edge of the inflatable element is secured to the upper part of the door frame.

When an accident such as side impart occurs the gas generator generates cold gas which passes through the hose 6 to the duct 7, and then inflates the cells 8. The inflatable element thus moves from its initial stored position within the recess in the door frame to the operative position shown in FIG. 1. The inflatable element then extends downwardly from the top of the door frame to form a flat structure located between the head of the person 1 and the adjacent window. As the cylindrical cells inflate the length of the lower edge 15 of the inflatable element is reduced, and thus the lower edge, together with the webbing strap 9 extend substantially tightly from the point 10 to the point 13. It is to be noted that the part of the door frame 4 between the points 10 and 13 is not linear, and defines, with the linear lower edge of the inflated element, a triangular area which is covered by the inflated element.

The lower edge of the inflated element decreases by about 10% between the uninflated state and the inflated state. The inflated element is fully inflated within about 15 ms. The total thickness of the inflated element, when inflated is approximately 30–40 mm. The seams of interweaving of the front part and the back part of the inflated element are approximately 30–40 mm apart, so that the resultant cells are cylindrical when inflated. The total volume of gas within the inflated element may be between 7 and 9 liters, and the gas may be at a pressure of about 3 bar. While the inflated element is not provided with a vent to vent gas from within the element to the atmosphere, so that the inflated element, when inflated, remains inflated for a long period of time—to provide protection in the case of a protracted roll-over—there is venting between at least selected adjacent cells 8, to avoid any severe rebound. Thus if the head of the person in the vehicle impacts with the inflated element the pressure of gas within the whole element, or at least a substantial part of the element will rise, thus giving a "soft" impact. If each cell were sealed with no venting of this type, there would be a risk of severe rebound.

The weight of the fabric should be kept to be as low as possible, so that if the inflatable element should impact with the head of the person in the vehicle as the inflatable element is inflated no harm will be done. It is thought that a material having a weight of less that 300 g/sq m, such as 175 g/sq m may be used.

It is to be noted that part of the inflated element extends rearwardly beyond the point 11, and is thus located between the head of the person 1 and the top of the B-post. Thus, the risk of the head of the person impacting with the B-pot is minimized. Since the upper edge of the inflatable element is secured to the upper part of the door frame along substantially the whole of its length, there is virtually no risk that the head of the occupant will pass between the upper edge of the inflatable element and the upper part of the door frame, with the head of the occupant of the vehicle thus inadvertently emerging from the body shell of the vehicle.

Figure 2:
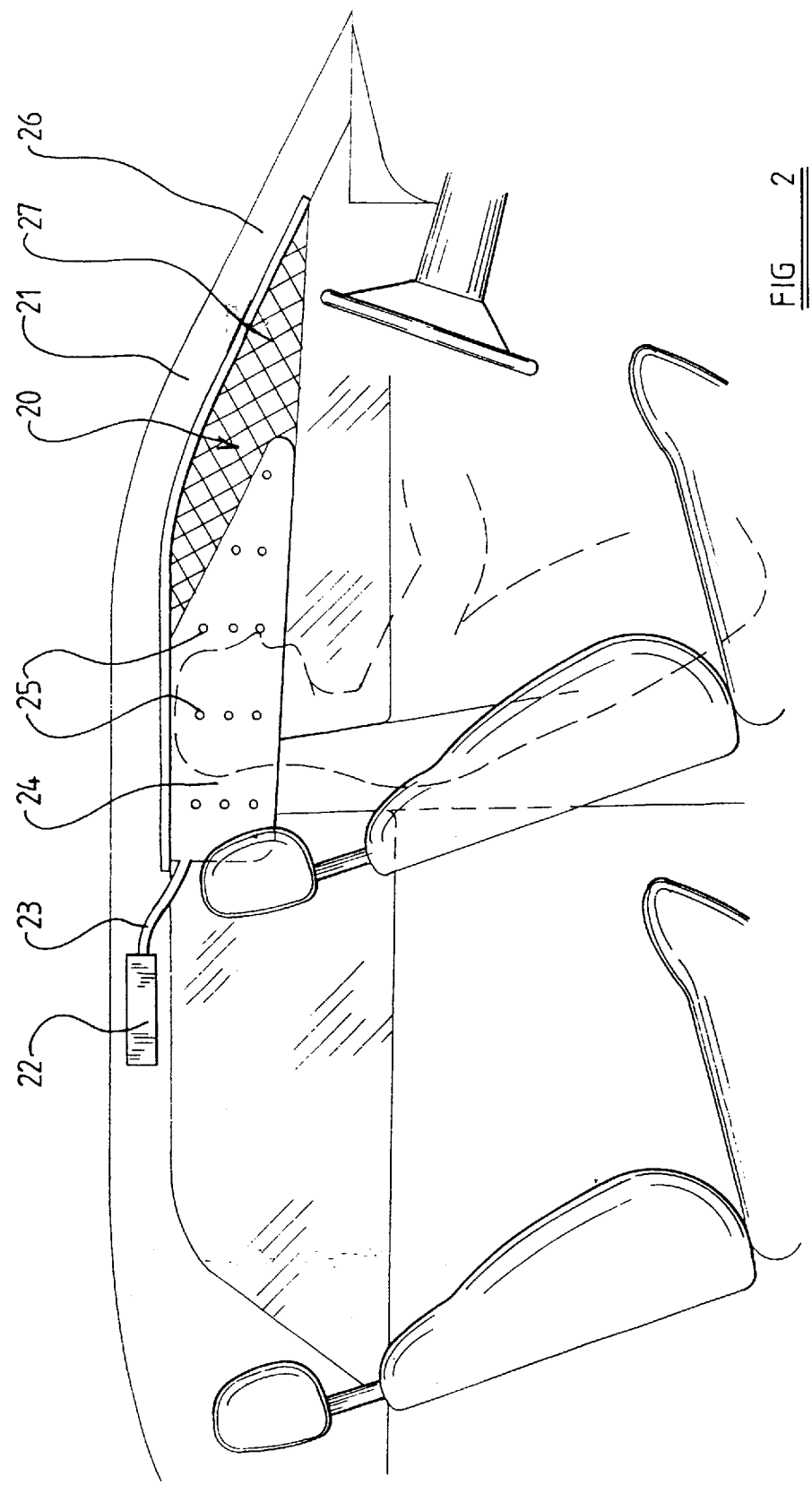
FIG. 2 is a side view of part of the interior of a motor vehicle illustrating another safety device in accordance with the invention in the operative state.

FIGS. 2 to 4 illustrate a second embodiment of the invention. In this embodiment an inflatable element 20 is provided which is initially stored in a recess provided in the door frame 21 of a motor vehicle. A gas generator 22 is provided, which again incorporates or is associated with a sensor or detector which activates the gas generator at an appropriate time. The gas generator is connected by a duct 23 to an inflatable part 24 of the inflatable element 20. The gas generator 22 is located in the door frame 21 of the vehicle, but alternatively could be positioned in the B-post.

The inflatable part 24 or the inflatable section of the inflatable element 20 is formed from two layers of fabric, as in the embodiment of FIG. 1, with the front layer and the back layer of the fabric being woven together at selected points 25. The selected points 25 are arranged in vertically extending columns and serve to divide the inflatable part 24 into a plurality of vertical parallel chambers. The spaces between the selected points 25 permit internal venting between adjacent chambers.

The inflatable part 24 of the inflatable element 20 is adapted to be located adjacent the head of an occupant of the motor vehicle, and, towards the rear of the inflatable element, when in the position illustrated in FIG. 2, the inflatable part of the inflatable element extends from the top to the bottom of the inflatable element in a rear region and subsequently, the upper edge of the inflatable part extends downwardly towards the lower edge of the inflatable element, in a sense directed towards the A-Post 26. The remaining part or non-inflatable section of the inflatable element comprises a web or sheet 27 which extends from the inflatable part 24 to the part of the door frame 21 above the door and to the A-post. The web or sheet 27 is thus secured to parts of the door frame that are non-linear. It is to be appreciated, therefore, that in this embodiment of the invention the upper edge of the inflatable element is of non-linear form and is of the same configuration as the non-linear part of the door frame which extends forwardly from the B-post and which incorporates the A-post. The upper edge of the inflatable element, or at least a substantial part of the upper edge, is securely fixed to the upper part of the door frame, thus again minimizing any risk of the head of the occupant emerging from the body shell between the upper edge of the inflatable element and the upper part of the door frame.

Referring to FIG. 3 the edge of the sheet 27 that is secured to the door frame 21 may terminate with a bead 28 that is received within a slot 29 formed in the door frame, the mouth of the slot being narrower than the base so that the bead 28 can slide axially within the slot, but cannot escape from the slot A cable 30 is connected to the end of the bead, as can be seen in FIG. 4, the cable being connected to a tensioning device 31. The tensioning device may comprise a piston in a cylinder associated with a gas generator to generate gas which moves the piston within the cylinder to apply tension to the cable 30 and thus to the bead 28. A ratchet or the like may hold the piston in place when it has been moved by the gas. The gas generator that supplies gas to the piston may be the gas generator 22 or may be a separate gas generator that is triggered simultaneously with the main gas generator When an accident occurs, the inflatable element 20 moves from its stored position to the operative position shown in FIG. 2, and tension is applied to the inflatable element 20 by the distention of the inflatable part 24, and by the tension applied to the bead 28. The inflated element 20 is thus held firmly in position to provide protection for the head of the person sitting in the motor vehicle. The thickness of the element 20 and the weight of the material used should be as described with reference to the embodiment of FIG. 1.

FIGS. 5 and 6 illustrate another embodiment of the invention intended to provide protection not only for a person in the front seat of a motor vehicle such as a motor car, but also for a person in the rear seat of the vehicle.

Referring to FIG. 5, a recess 40 is provided in the doorframe 41 of a motor vehicle, the recess extending over both the front door 42 and the rear door 43. The recess extends from a point 44 located near the lower end of the A-post to a point 45 located near the lower end of the C-post.

A channel 46 is provided on the B-post, extending vertically. In the channel 46 is a ratchet R, and received within the upper end of the channel 46 is a ratchet engaging slide member 47. The slide member 47 is connected to a tab 48 which forms part of an inflatable element 49 (see FIG. 6), which is initially stored within the recess 40.

The inflatable element 49 is shown in the inflated state in FIG. 6. The inflatable element has its top edge 50 secured to the part of the door frame 41 that extends above the doors 42, 43 of the motor vehicle. The top edge of the inflatable element is of non-linear configuration, and has a configuration which corresponds with the non-linear configuration of the upper part of the door frame. The design of the inflatable element is similar to that shown in FIG. 1, with the inflatable element presenting a plurality of parallel cells, which when inflated are substantially cylindrical. The structure of the inflatable element 49 may be the same as that described with reference to FIG. 1.

A gas generator 51 is provided which is connected to the inflatable element in such a way that when the gas generator is activated by a sensor that is formed integrally with the gas generator, or which is associated with the gas generator, and which responds to a side impact or to a roll-over situation to activate the gas generator, gas is initially supplied to the cells 52, 53, which are aligned with the tab 48. Thus initially, as the inflatable element 49 inflates, the cells 52 and 53 inflate and move the ratchet engaging slide member 47 downwardly. The ratchet engaging slide member thus moves down the slot 46 to the position shown in FIG. 6. The ratchet engaging slide member 47 engages the ratchet, and thus holds the tab 48 in its lower position.

The rest of the cells 54 of the inflatable element are then inflated, and the inflatable element then extends fully across the upper parts of the windows in the doors 42, 43 of the motor vehicle. It can be seen that the lower edge of the inflated element 49 extends between the points 44 and 45 at the ends of the recess 40. As the inflatable element 49 inflates, so the length of the lower edge thereof decreases as a consequence of the inflation of the cells of the inflatable element. This reduction in the length of the lower edge, together with the action of the ratchet engaging slide member 47 ensures that the inflated element is retained in position as illustrated after it has been inflated.

FIG. 7 is a cross section showing the nature of the cells of the inflated element of FIG. 1 and of FIGS. 5 and 6. It can be seen that the cells are immediately adjacent to each other and are only separated by narrow regions where the fabric forming the front part of the inflated element has been woven with the fabric forming the back part of the inflated element. However, FIG. 8 illustrates an alternative possibility, in which the regions of fabric between the cells that are woven together are relatively wide, the cells thus being separated by webs of fabric. The advantage of this latter possibility is that a smaller volume of gas may be required to fully inflate the inflatable element, meaning that the inflatable element may be inflated more rapidly.

Figure 9:
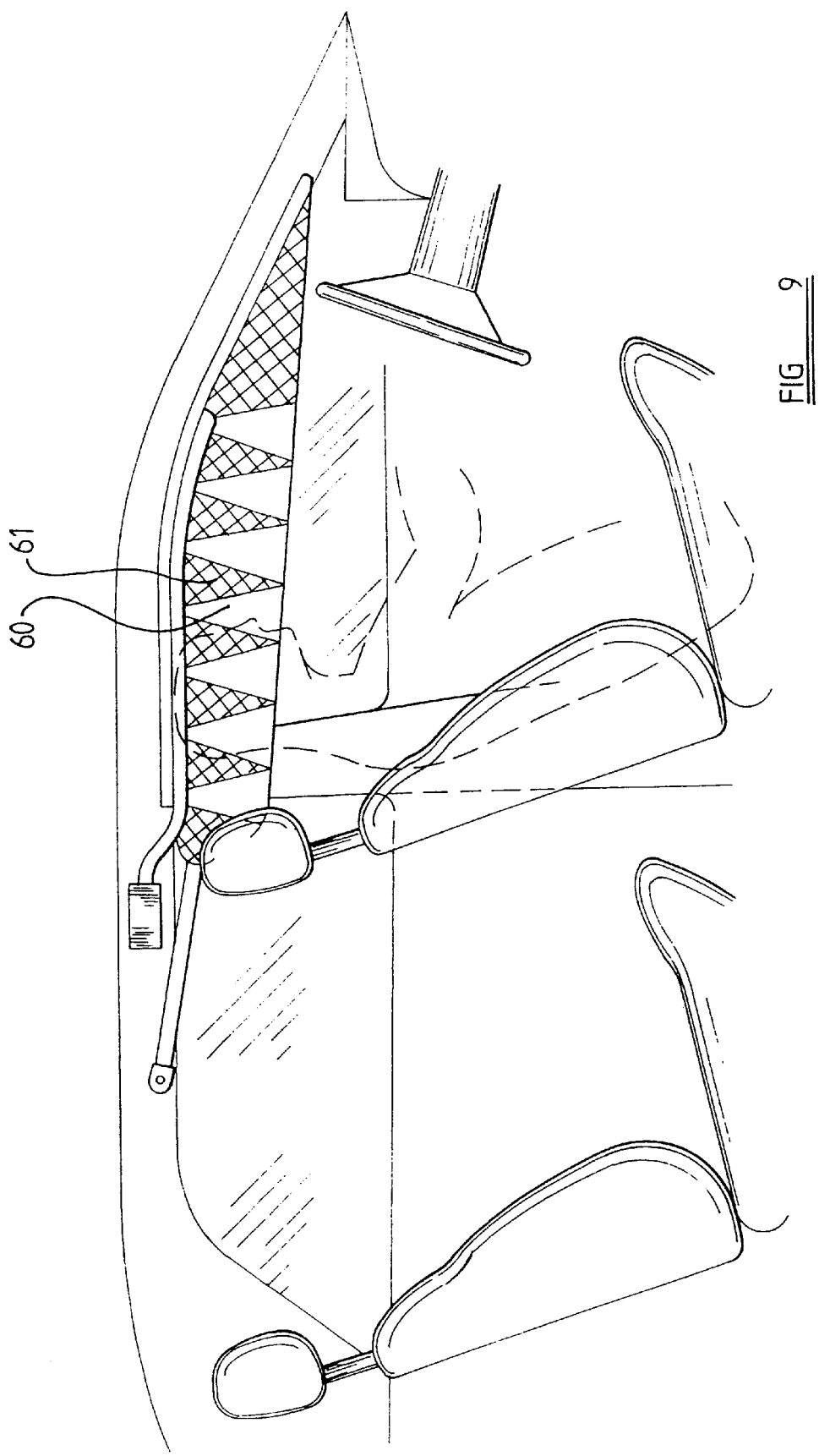
FIG. 9 is a view of part of an alternative inflatable element for use in the embodiments of FIGS. 1, 5 and 6.

FIG. 9 illustrated an alternative form of inflatable element comprising a plurality of cells 60 or inflatable sections. The upper edge of the inflatable element is of non-linear form and is connected to the non-linear portion of the door frame above the door. The configuration of the upper edge of the inflatable element and the configuration of the door frame correspond. It can be seen that each cell 60 is of substantially conical form, the cells being arranged adjacent each other and being parallel with each other. Between the cells are inverted triangular portions 61 or non-inflatable sections where the fabric forming the cells is interwoven.

When cells of this type are inflated, the length of the lower edge of the arrangement contracts, whereas the length of the upper edge of the arrangement remains constant.

An arrangement of this type can be used, therefore, to ensure that the lower edge of the element, when inflated, is under some tension.

Whilst in the arrangement illustrated in FIG. 9, the cells are immediately adjacent each other, it is to be appreciated that a similar effect may be achieved if the cells are spaced apart. It is possible to replace at least part of the inverted triangular region 61 with further conical cells of an inverted orientation.

While in the described embodiments of the invention the inflatable element has been described as being made utilising a technique in which two layers of fabric are interwoven to define points or lines where the front layer and the rear layer are interwoven, it would be possible to form embodiments of the invention utilising two discrete layers of fabric which are interconnected by stitching.

What is claimed is:

1. A safety device in a motor vehicle having a door frame with a front door and a rear door comprising:

a gas generator;

a sensor associated with said gas generator for sensing at least one of a side impact and a roll-over to activate said gas generator; and an inflatable element connected to said gas generator to be inflated by gas from said gas generator upon activation of said gas generator, said inflatable element having an upper edge portion with a duct through which the gas flows and comprising a first layer of fabric and a second layer of fabric where selected parts of the first layer and the second layer are interconnected to define one of points and lines so that the first and second layers of said inflatable element are secured together forming elongated cells;

where the upper edge portion of said inflatable element is secured from a first end to a second end at selected points to a non-linear part of the door frame, which extends over both the front and rear doors, and where said gas generator is positioned between the first and second ends of said upper edge portion of said inflatable element.

2. A safety device according to claim 1, wherein said gas generator is located substantially in the center of said upper edge portion of said inflatable element.

3. A safety device according to claim 1, wherein the duct of said upper edge portion is arranged so that gas is initially supplied to elongated cells substantially m the center of said inflatable element after said sensor activates said gas generator thereby inflating the center elongated cells first.

4. A safety device according to claim 1, wherein the one of points and lines interconnecting the first and second layers of said inflatable element form adjacent elongated cells separated by narrow regions.

5. A safety device according to claim 1, wherein the one of points and lines interconnecting the first and second layers of said inflatable element form elongated cells separated by webs of fabric.

6. A safety device according to claim 1, further comprising an A-post located in front of the front door and a C-post located behind the rear door wherein said inflatable element extends from the A-post to the C-post.

\* \* \* \* \*